United States Patent
Vollmer et al.

(10) Patent No.: US 9,716,450 B2
(45) Date of Patent: Jul. 25, 2017

(54) ELECTRONICALLY COMMUTATED ELECTRIC MOTOR WITH HARMONIC COMPENSATION

(71) Applicant: Robert Bosch GmbH, Stuttgart (DE)

(72) Inventors: Ulrich Vollmer, Weilheim (DE); Yanhui Xu, Stuttgart Sommerrain (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/896,970

(22) PCT Filed: Apr. 3, 2014

(86) PCT No.: PCT/EP2014/056636
§ 371 (c)(1),
(2) Date: Dec. 9, 2015

(87) PCT Pub. No.: WO2014/198437
PCT Pub. Date: Dec. 18, 2014

(65) Prior Publication Data
US 2016/0111986 A1    Apr. 21, 2016

(30) Foreign Application Priority Data
Jun. 14, 2013    (DE) .................. 10 2013 211 151

(51) Int. Cl.
*H02K 29/06*    (2006.01)
*H02P 6/10*    (2006.01)
(Continued)

(52) U.S. Cl.
CPC .............. *H02P 6/10* (2013.01); *H02K 11/21* (2016.01); *H02K 11/27* (2016.01); *H02P 6/001* (2013.01); *H02P 6/16* (2013.01); *H02P 21/14* (2013.01)

(58) Field of Classification Search
CPC ......... B62D 5/0472; H02P 6/10; H02P 21/05; H02P 25/098
See application file for complete search history.

(56) References Cited

U.S. PATENT DOCUMENTS

| 2012/0268052 A1 | 10/2012 | Nam et al. | |
| 2014/0229054 A1* | 8/2014 | Gerundt | B62J 99/00 701/29.4 |
| 2015/0081186 A1* | 3/2015 | Yasui | B60T 8/173 701/70 |

FOREIGN PATENT DOCUMENTS

| JP | 2004064909 | 2/2004 |
| JP | 2004359178 | 12/2004 |

(Continued)

OTHER PUBLICATIONS

International Search Report for Application No. PCT/EP2014/056636 dated Oct. 21, 2014 (English Translation, 3 pages).

(Continued)

*Primary Examiner* — Karen Masih
(74) *Attorney, Agent, or Firm* — Michael Best & Friedrich LLP

(57) ABSTRACT

The invention relates to an electronically commutated electric motor with a stator and a rotor, which is designed as a permanent magnet rotor in particular. The electric motor also has a control unit which is connected to the stator. The control unit is designed to generate control signals for energizing the stator coils of the stator in order to generate a rotational magnetic field. The electric motor is designed to at least partly compensate for a torque ripple of a torque generated by the rotor. According to the invention, the electric motor has a rotor position sensor and a current sensor. The current sensor is designed to detect currents flowing in the stator coils and to generate a current signal which represents the currents. The control unit preferably (Continued)

has a processing unit which is designed to ascertain harmonics of the electromotive force dependent on the current signal, a voltage applied to the stator coils, and a rotor position signal generated by the rotor position sensor and to generate a control signal which compensates for the effect of the harmonics. The control unit, in particular the processing unit, is designed to superimpose the compensating control signal with the control signal so as to completely or at least partly compensate for the effect of the harmonics and thus the torque ripple.

10 Claims, 1 Drawing Sheet

(51) Int. Cl.
*H02K 11/21* (2016.01)
*H02K 11/27* (2016.01)
*H02P 6/00* (2016.01)
*H02P 6/16* (2016.01)
*H02P 21/14* (2016.01)

(56) References Cited

FOREIGN PATENT DOCUMENTS

| | | |
|---|---|---|
| JP | 2012029559 | 2/2012 |
| JP | 2013021913 | 1/2013 |
| WO | 2012126029 | 9/2012 |

OTHER PUBLICATIONS

Delaleau et al., "Flatness-based hierarchical control of the PM synchronous motor," American Control Conference 2004, Jun. 30-Jul. 2, 2004, pp. 65-70, vol. 1.

* cited by examiner

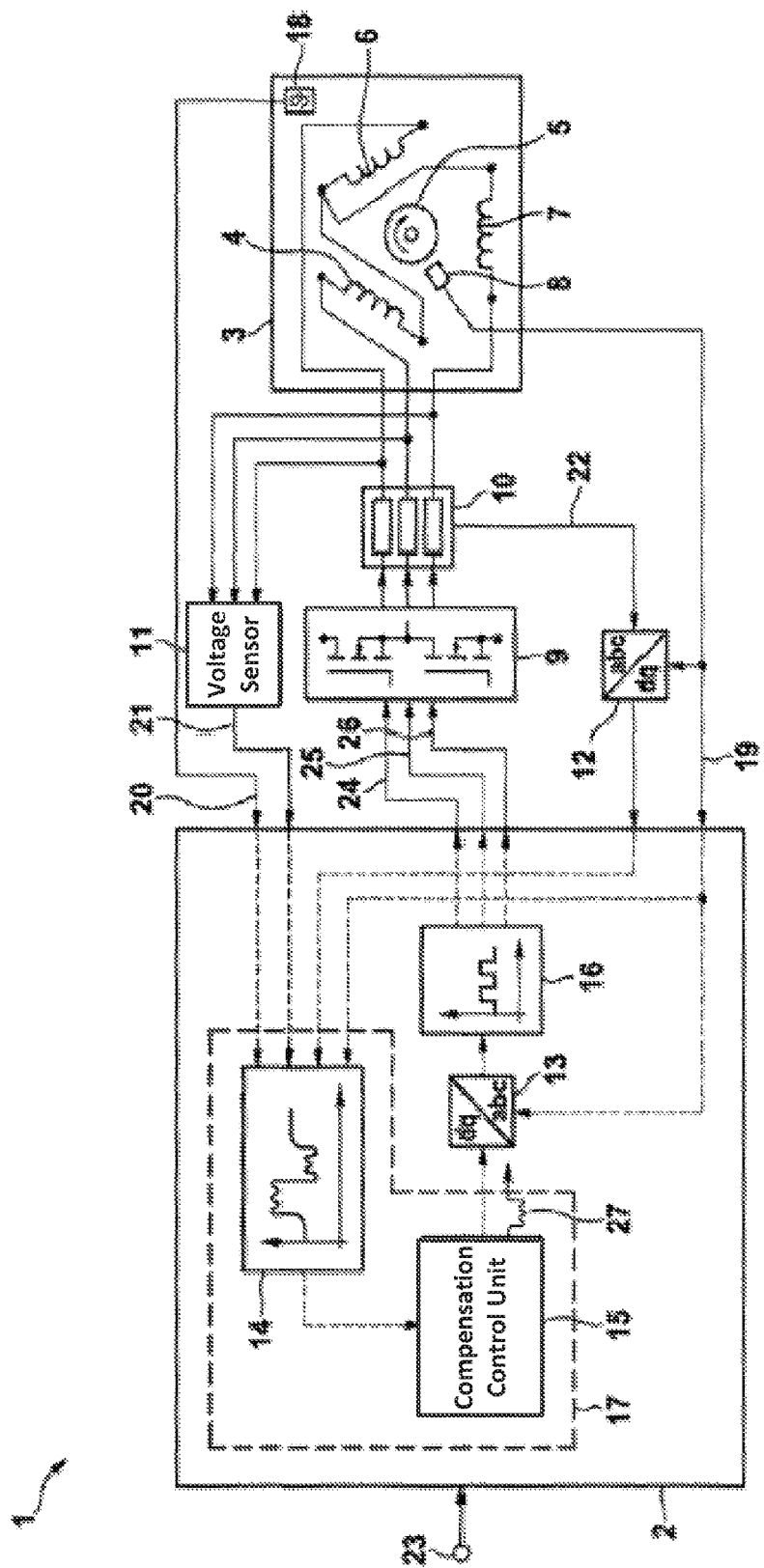

US 9,716,450 B2

ELECTRONICALLY COMMUTATED ELECTRIC MOTOR WITH HARMONIC COMPENSATION

BACKGROUND OF THE INVENTION

The present invention relates to an electric drive, in particular an electronically commutated electric machine or an electronically commutated electric motor having a stator and a rotor which is in particular designed as a permanent magnet rotor. The electric motor also includes a control unit which is connected to the stator. The control unit is designed to generate control signals for supplying stator coils of the stator with current for generating a rotating magnetic field. The electric motor is designed to at least partially compensate for a torque ripple of a torque generated by the rotor.

SUMMARY OF THE INVENTION

According to the present invention, the electric drive, in particular the electric motor or the electric machine of the kind initially specified, includes a rotor position sensor and a current sensor. The current sensor is designed to detect current flowing in the stator coils and to generate a current signal representing the currents. The control unit can include a processing unit which is designed to ascertain harmonics of the electromotive force and to generate a control signal which compensates for the effect of the harmonics, as a function of the current signal and a voltage supplied to the stator coils and a rotor position signal generated by the rotor position sensor. The control unit, in particular the processing unit, is designed to overlap the compensating control signal with the control signal, so that it is possible to compensate at least partially or completely for the effect of the harmonics and thus the torque ripple.

It has in fact been found that the torque of the electric motor causes a constant torque in the case of an electromotive force whose temporal profile is sinusoidal, whereas the rotor designed as a permanent magnet generates harmonics in the EMF, causing an undesirable frequency content in the temporal torque profile which manifests itself as so-called torque ripple.

Thus, the electric drive is advantageously able to generate no unpleasant noises when generating a torque. In an electric motor which, for example, is an integral part of a power steering system of a motor vehicle, the harmonics generated by the electric motor may be transmitted into a vehicle interior as noises which are perceptible to the human ear, or transmitted as vibrations via a steering column. The electric motor may advantageously also generate less background noise as an integral part of other electric drives, for example, as a drive of a washing machine, as a drive of an electric bicycle, or as a drive of an electric vehicle.

The electronically commutated electric motor is, for example, a synchronous machine, a synchronous machine having a rotor which is designed as a permanent magnet, an asynchronous machine, a reluctance machine, or a transverse flux machine.

The present invention also relates to an electric machine having the characteristics of the electric motor of the aforementioned type. The electric machine may be operated both as an electric motor and additionally as a generator. When characteristics of the electric motor are described in the following exemplary embodiments, they also apply analogously to the electric machine.

The processing unit can be formed via a microprocessor, a microcontroller, an ASIC (application-specific integrated circuit), or a digital signal processor.

In one embodiment, the electric motor includes a voltage sensor, wherein the voltage sensor is connected to the stator coils and is designed to detect the voltages dropping across the stator coils, wherein the control unit, in particular the processing unit, is designed to generate the control signal compensating for the harmonics as a function of the detected voltages dropping across the stator coils. The voltages dropping across the stator coils then correspond to the previously mentioned voltages supplied to the stator coils. The voltage may thus advantageously be detected by means of the voltage sensor, whereas the voltage may otherwise be assumed to be known, being a predetermined voltage.

In another embodiment, the control unit, in particular the processing unit, includes an RLS estimator which is designed to ascertain the harmonics, in particular the phase and amplitude of the harmonics, by means of a least-squares method. Furthermore, the control unit can be designed to generate the compensating control signal as a function of the ascertained harmonics. Thus, an in-situ ascertainment of the harmonics generated by the electric motor may be carried out by the control unit, in particular the processing unit, as a function of the stator coil currents or additionally of the stator coil voltages and the rotor position signal.

The in-situ characteristic means that the ascertainment of, more preferably, the compensation for, the harmonics may be carried out on the fastest possible processing path of the signals during the operation of the electric motor.

In another embodiment, the control unit, in particular the processing unit, is designed to control the stator by means of a flatness-based control as a function of the compensating control signal, and thus as a function of the EMF harmonics ascertained by the RLS estimator. A nonlinear system, represented by electric motor, may advantageously be controlled by means of the flatness-based control.

In another embodiment, the control unit is designed to generate a voltage for supplying the stator coils as a function of the compensating control signal. Thus, the torque generated by the electric motor may advantageously be free of the torque ripple, or the torque ripple in the torque may be reduced.

In another embodiment, the processing unit is designed to generate a torque signal representing a compensating torque as a function of the harmonics ascertained by the RLS estimator, and to generate the compensating control signal as a function of the compensating torque signal. Thus, an in-situ ascertainment of the harmonics generated by the electric motor may advantageously be carried out, in particular as a function of the detected phase currents and phase voltages. The compensation for the harmonics may therefore also be carried out in situ. The in-situ compensation means that during a motor operation, the harmonics generated by the electric motor occurs during the instantaneous current supply state of the electric motor as rapidly as possible, in particular by means of the processing unit and the computing means which is thus available, so that practically no noticeable radiation of the harmonics is possible, to the extent that the harmonics are not able to arise with the compensating torque signal.

In another embodiment of the electric motor, the processing unit includes an electrical model of the electric motor which represents a manipulated variable for the voltage to be supplied to the stator coils as a function of the inductance of the stator coils and an ascertained magnetic flux, wherein the magnetic flux includes the harmonics to be compensated for, and the processing unit is designed to generate the compensating control signal as a function of the manipulated variable. Thus, the compensating control signal may advantageously be generated without measuring the harmonics actually radiated by the electric motor, for example, by means of a microphone or a structure-borne sound sensor.

In another embodiment, the magnetic flux represents the harmonics in the form of a Fourier series. It is thus advantageously possible to selectively compensate in particular for odd harmonics, which form a substantial portion of the spurious spectrum of the torque, by means of the compensating torque signal.

The present invention also relates to an electrical power steering system for a vehicle including an electric motor of the aforementioned type. The power steering system is designed to generate a steering torque which aids steering by means of the electric motor.

The present invention also relates to a brake booster for a vehicle including an electric motor of the aforementioned type. The brake booster is designed to generate a braking force which aids braking by means of the electric motor.

The present invention also relates to an electric bicycle including an electric motor of the aforementioned type. The electric motor is a drive motor of the electric bicycle.

Other aspects of the invention will become apparent by consideration of the detailed description and accompanying drawings.

BRIEF DESCRIPTION OF THE DRAWINGS

The FIGURE shows one exemplary embodiment of an electric drive, in particular an electronically commutated electric motor, which is designed to compensate for the ripple in the torque, and for this purpose, to ascertain harmonics arising and to generate a control signal compensating for the effect of the harmonics and to control the electric motor via the compensating control signal, as a function of an electric model of the electric motor and detected stator coil currents, stator coil voltages, and an ascertained rotor position, so that the torque ripple in a torque generated by the electric motor is eliminated.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

The FIGURE shows one exemplary embodiment of an electronically commutated electric motor 1. The electric motor 1 includes a control unit 2, a stator 3, and a rotor 5. In this exemplary embodiment, the stator 3 has three stator coils 4, 6, and 7. The electric motor 1 also includes a power output stage 9. The power output stage 9 is connected to the stator coils 4, 6, and 7 on the output side via a current sensor 10 and is designed to supply the stator coils 4, 6, and 7 with current for generating a rotating magnetic field. In this exemplary embodiment, the rotor 5 is designed as a permanent magnet. The electric motor 1 also includes a rotor position sensor 8 which is designed to detect a rotor position of the rotor 5 and to generate and output a rotor position signal corresponding to the rotor position. The rotor position sensor 8 is, for example, a magnetoresistive sensor, in particular an AMR (anisotropic magnetoresistive) sensor or a GMR (giant magnetoresistive) sensor. In this exemplary embodiment, the current sensor is formed via a shunt resistor for each stator coil.

The electric motor 1 also includes a temperature sensor 18 which is designed to detect a temperature of the stator, in particular a plate pack of the stator 3, and to generate a temperature signal representing the temperature. The control unit 2 is connected on the input side to the rotor position sensor 8 via a connecting line 19 and to the temperature sensor 18 via a connecting line 20. The electric motor 1 also includes a voltage sensor 11 which is connected on the input side to the stator coils 4, 6, and 7, and is designed to detect a voltage dropping across the stator coils and to generate a corresponding voltage signal and to output it on the output side. The voltage sensor 11 is connected on the output side to the control unit 2 via a connecting line 21.

The current sensor 10 is designed to detect currents flowing through the stator coils 4, 6, and 7 and to generate a current signal representing the currents and to transmit it on the output side to the control unit 2 via a connecting line 22. In this exemplary embodiment, the current sensor 10 is connected to the control unit 2 via a coordinate transformer 12. The coordinate transformer 12, which may be an integral part of the control unit 2, is designed to detect the phase currents flowing through the stator coils 4, 6, and 7 and to transform them into a rotor coordinate system, in particular by means of Park's transformation, and to output them on the output side. The rotor coordinate system is, for example, a d-q coordinate system.

The control unit 2 includes a pulse width modulator 16 which is designed to generate control signals for generating a rotating magnetic field and to transmit them on the output side to the power output stage 9 via connecting lines 24, 25, and 26. In this exemplary embodiment, the power output stage 9 includes a semiconductor half-bridge for each of the stator coils 4, 6, and 7.

In this exemplary embodiment, the control unit 2 includes a compensation unit 17, which may be formed by the aforementioned processing unit.

The compensation unit 17 is designed to estimate the harmonics in a temporal profile of the EMF (electromotive force) of the electric motor 1 and to generate a control signal 27 compensating for the effect of the harmonics and to transmit it on the output side to the pulse width modulator 16 for controlling the power output stage 9, as a function of the current signal received on the input side from the current sensor 10, of the rotor position signal received from the rotor position sensor 8 and of the voltage signal received on the input side from the voltage sensor 11 and of the temperature signal received from the temperature sensor 18. A coordinate transformer 13 is situated in the signal path between the compensation unit 17 and the pulse width modulator 16, which is designed to transform the control signal generated by the compensation unit 17 from rotor coordinates into stator coordinates, in particular into a three-phase system, in particular by means of Park's transformation. The coordinate transformers 12 and 13 are each connected to the rotor position sensor 8 via the connecting line 19 and are able to receive the rotor position signal from it for the coordinate transformation.

In this exemplary embodiment, the compensation unit 17 includes an RLS estimator 14. The RLS estimator 14 is designed to ascertain a magnetic flux, in particular the Fourier coefficients of the fundamental and harmonics of the magnetic flux, by means of a model representing the electric motor 1, in particular the inductances and the resistances of the stator coils 4, 6, and 7, and by means of the least-squares method, and to generate and output an output signal on the output side representing the harmonics of the magnetic flux, as a function of the voltage signal received by the control unit 2 on the input side, of the current signal, of the temperature signal, and of the rotor position signal. The compensation unit 17 also includes a compensation control unit 15 which is connected on the input side to the RLS estimator 14. The compensation control unit 15 is designed to generate the compensating control signal 27 and to transmit it to the pulse width modulator 16 as a function of the output signal generated by the RLS estimator 14, which represents the ascertained Fourier coefficients, and as a function of a torque signal received on the input side 23 representing a setpoint torque. The pulse width modulator 16 is able to generate a control pulse pattern for supplying the stator 3 with current from the torque signal and the compensating control signal and to transmit it to the power output stage 9. It is thus ensured that the electric motor 1 generates a torque corresponding to the torque signal which is free of torque ripple.

The control unit 2 also has an input 23 for a torque signal. The torque signal represents a setpoint torque of a torque to be generated by the electric motor 1 and to be generated on the output side on a rotor shaft of the rotor 5.

The RLS estimator 14 may, for example, include the following electrical model of the electric motor:

$$\begin{bmatrix} U_d \\ U_q \end{bmatrix} = R \begin{bmatrix} I_d \\ I_q \end{bmatrix} + \begin{bmatrix} L_d \dot{I}_d \\ L_q \dot{I}_q \end{bmatrix} + \dot{\varphi} \begin{bmatrix} -\Psi_q \\ \Psi_d \end{bmatrix} \qquad (1)$$

in which:
$U_{d,q}$=voltage across the stator coils, in rotor coordinates
$I_{d,q}$=current through the stator coils, in rotor coordinates
$L_{d,q}$=inductance of the stator coils, in rotor coordinates
R=ohmic resistance of the stator coils
$\Psi_{d,q}$=magnetic flux, in rotor coordinates
$\varphi_{d,q}$=rotor angle electrically detected by the rotor position sensor.

The magnetic flux linkage in equation 1 may be depicted as follows:

$$\begin{bmatrix} \Psi_d \\ \Psi_q \end{bmatrix} = \begin{bmatrix} L_d I_d \\ L_q I_q \end{bmatrix} + \begin{bmatrix} \Psi_{pm\_d} \\ \Psi_{pm\_q} \end{bmatrix} \qquad (2)$$

in which the index pm stands for permanent magnet, in the case of a rotor designed as a permanent magnet, and the indices d and q mean that the magnetic flux is ascertained in rotor coordinates.

After Park's transformation from $\Psi_{pm\ a/b/c}$, the vector for the magnetic flux of the rotor permanent magnet is created in stator coordinates, which are depicted in equation 3:

$$\begin{bmatrix} \Psi_{pm\_a} \\ \Psi_{pm\_b} \\ \Psi_{pm\_c} \end{bmatrix} = \qquad (3)$$

$$\begin{bmatrix} a_1\cos(\varphi) + a_5\cos(5\varphi) + a_7\cos(7\varphi) + a_{11}\cos(11\varphi) + a_{13}\cos(13\varphi) \\ \Psi_{pm\_a}\left(\varphi - \frac{2\pi}{3}\right) \\ \Psi_{pm\_a}\left(\varphi + \frac{2\pi}{3}\right) \end{bmatrix}$$

in which the indices a, b, c each represent one phase of a three-phase stator, i.e., a stator having three stator coils, and the coefficients $a_1$, $a_5$, $a_7$, $a_{11}$, and $a_{13}$ are each Fourier coefficients.

The elements of the vector are functions of amplitudes of the EMF (electromotive force) harmonics and the electrical angles $\varphi$.

$$\begin{bmatrix} \Psi_{pm\_d} \\ \Psi_{pm\_q} \end{bmatrix} = \begin{bmatrix} a_1 - (5a_5 - 7a_7)\cos(6\varphi) - (11a_{11} - 13a_{13})\cos(12\varphi) \\ (5a_5 + 7a_7)\sin(6\varphi) + (11a_{11} + 13a_{13})\sin(12\varphi) \end{bmatrix} \qquad (4)$$

The following assumptions are based on the model stored in the RLS estimator 14:

There are no iron losses due to the eddy currents; The resistance in each of the phases a, b, and c is the same; There are neither harmonics nor is there an asymmetry in the self-inductance and mutual inductance of the three phases a, b, and c;

There is no asymmetry in the permanent magnet flux $\Psi_{pm}$ in each of the phases a, b, and c.

For example, the model has odd EMF harmonics, in particular of the fifth order, seventh order, eleventh order, and thirteenth order.

The RLS estimator 14 in FIG. 1 is able to ascertain the harmonics in such a way that the following equation is best satisfied in terms of the least-squares error:

$$\begin{bmatrix} 0 & 5\sin(6\varphi) & 7\sin(6\varphi) & 11\sin(12\varphi) & 13\sin(12\varphi) \\ 1 & -5\cos(6\varphi) & 7\cos(6\varphi) & -11\cos(12\varphi) & 13\cos(12\varphi) \end{bmatrix} \cdot \begin{bmatrix} a_1 \\ a_5 \\ a_7 \\ a_{11} \\ a_{13} \end{bmatrix} = \qquad (5)$$

$$\begin{bmatrix} -\dfrac{U_d - RI_d - L_d \dot{I}_d + \dot{\varphi} L_q I_q}{\dot{\varphi}} \\ \dfrac{U_q - RI_q - L_q \dot{I}_q - \dot{\varphi} L_d I_d}{\dot{\varphi}} \end{bmatrix}$$

The general torque equation for the electric motor 1 is:

$$M = \frac{3}{2} N_P (I_q \Psi_d - I_d \Psi_q) \qquad (6)$$

After applying (2) in (6) for taking EMF harmonics into account, the torque equation results:

$$M = \frac{3}{2} N_P [I_q (\Psi_{pm\_d}(a_{1 \to 13}, \varphi) + L_d I_d) - I_d (\Psi_{pm\_q}(a_{5 \to 13}, \varphi) + L_q I_q)] \qquad (7)$$

The setpoint value $I^*_q$ is then determined by the compensation control unit 15 from equation 7:

$$I^*_q = \frac{\dfrac{M^*}{1,5 N_P} + I^*_d \Psi_{pm\_q}(a_{5 \to 13}, \varphi)}{\Psi_{pm\_d}(a_{1 \to 13}, \varphi) + (L_d - L_q) I^*_d} \qquad (8)$$

The principle of the flatness-based control of the control unit 2 in the FIGURE is that the manipulated variables $U^*_d$ and $U^*_q$ are able to be ascertained directly by the control unit 2, preferably according to the voltage equation (1).

After applying the setpoint values of currents and their time derivatives in equation (1), the manipulated variables for the voltage $U^*_d$ and $U^*_q$ may be ascertained by the control unit 2 according to equation (9):

$$\begin{bmatrix} U^*_d \\ U^*_q \end{bmatrix} = R \begin{bmatrix} I^*_d \\ I^*_q \end{bmatrix} + \begin{bmatrix} L_d \dot{I}^*_d \\ L_q \dot{I}^*_q \end{bmatrix} + \dot{\varphi} \begin{bmatrix} -\Psi_q(I^*_q, L_q, a_{5 \to 13}, \varphi) \\ \Psi_d(I^*_d, L_d, a_{1 \to 13}, \varphi) \end{bmatrix} \quad (9)$$

The time derivative of the setpoint torque $\dot{M}^*$, which may be ascertained by the control unit 2 for ascertainment from the time derivatives of the currents $\dot{I}^*_d$ and $\dot{I}^*_q$, may, for example, be determined by a state variable filter of the control unit 2.

By means of the control unit thus designed, it is advantageously possible to carry out an in-situ compensation for the resulting torque ripple, so that the temporal profile of the torque output on a motor shaft of the rotor 5 in the FIGURE has little or no torque ripple which may be output via the motor shaft as structure-borne sound and which may be radiated by components connected to the motor shaft as annoying airborne noise.

The invention claimed is:

1. An electronically commutated electric motor having a stator and a rotor, the electric motor comprising:
    a control unit connected to the stator, and configured to generate control signals for supplying stator coils of the stator with current for generating a rotating magnetic field, and wherein the electric motor is configured to at least partially compensate for a torque ripple of a torque generated by the rotor,
    a rotor position sensor; and
    a current sensor,
    wherein the current sensor is configured to detect currents flowing in the stator coils and to generate a current signal representing the currents flowing in the stator coils,
    wherein the control unit comprises a processing unit, wherein the processing unit is configured to ascertain harmonics of an electromotive force and to generate a compensating control signal which compensates for the effect of the harmonics as a function of the current signal and a voltage supplied to the stator coils and a rotor position signal generated by the rotor position sensor, and wherein the processing unit is further configured to overlap the compensating control signal with the control signal, so that it is possible to compensate at least partially or completely for the effect of the harmonics and thus the torque ripple.

2. The electric motor as claimed in claim 1, wherein the processing unit further comprises a root least squared estimator configured to ascertain the harmonics, by a least-squares method.

3. The electronically commutated electric motor as claimed in claim 1, wherein the processing unit is configured to control the stator by a flatness-based control as a function of the compensating control signal.

4. The electronically commutated electric motor as claimed in claim 2, wherein the control unit is configured to generate a voltage for supplying the stator coils as a function of the compensating control signal.

5. The electronically commutated electric motor as claimed in claim 2, wherein the processing unit is configured to generate a torque signal representing a compensating torque as a function of the harmonics ascertained by the root least squared estimator, and to generate the compensating control signal as a function of the compensating torque signal.

6. The electronically commutated electric motor as claimed in claim 1, wherein the processing unit further comprises an electrical model of the electric motor, wherein the electrical model represents a manipulated variable for the voltage to be supplied to the stator coils as a function of the inductance of the stator coils, and an ascertained magnetic flux, wherein the magnetic flux includes the harmonics to be compensated for, and wherein the processing unit is configured to generate the compensating control signal as a function of the manipulated variable.

7. The electric motor as claimed in claim 6, wherein the magnetic flux represents the harmonics in the form of a Fourier series.

8. An electrical power steering system for a vehicle, the system comprising:
    an electric motor, the electric motor including
    stator;
    a rotor;
    a control unit connected to the stator and configured to generate control signals for supplying stator coils of the stator with current for generating a rotating magnetic field, a rotor position sensor; and
    a current sensor configured to detect currents flowing in the stator coils and to generate a current signal representing the currents flowing in the stator coils,
    wherein the control unit comprises a processing unit configured to ascertain harmonics of an electromotive force and to generate a compensating control signal which compensates for the effect of the harmonics as a function of the current signal and a voltage supplied to the stator coils and a rotor position signal generated by the rotor position sensor, and wherein the processing unit is further configured to overlap the compensating control signal with the control signal, so that it is possible to compensate at least partially or completely for the effect of the harmonics and thus the torque ripple, and
    wherein the power steering system is configured to generate a steering torque which aids steering by means of the electric motor.

9. A brake booster for a vehicle including an electric motor, having a stator and a rotor, wherein the electric motor comprises a control unit connected to the stator, wherein the control unit is configured to generate control signals for supplying stator coils of the stator with current for generating a rotating magnetic field, and wherein the electric motor is configured to at least partially compensate for a torque ripple of a torque generated by the rotor,
    wherein the electric motor includes a rotor position sensor and a current sensor, wherein the current sensor is configured to detect currents flowing in the stator coils and to generate a current signal representing the currents flowing in the stator coils,
    wherein the control unit comprises a processing unit, wherein the processing unit is configured to ascertain harmonics of an electromotive force and to generate a compensating control signal which compensates for the effect of the harmonics as a function of the current signal and a voltage supplied to the stator coils and a rotor position signal generated by the rotor position sensor, and wherein the processing unit is further configured to overlap the compensating control signal with the control signal, so that it is possible to compensate at least partially or completely for the effect of the harmonics and thus the torque ripple, and wherein the brake booster is configured to generate a braking force which aids braking by means of the electric motor.

10. An electric bicycle including an electric motor, the electric motoring including a stator;

a rotor, a control unit connected to the stator and configured to generate control signals for supplying stator coils of the stator with current for generating a rotating magnetic field;

a rotor position sensor; and a current sensor, wherein the current sensor is configured to detect currents flowing in the stator coils and to generate a current signal representing the currents flowing in the stator coils, wherein the control unit includes a processing unit configured to ascertain harmonics of an electromotive force and to generate a compensating control signal which compensates for the effect of the harmonics as a function of the current signal and a voltage supplied to the stator coils and a rotor position signal generated by the rotor position sensor, and wherein the processing unit is further configured to overlap the compensating control signal with the control signal, so that it is possible to compensate at least partially or completely for the effect of the harmonics and thus the torque ripple, and wherein the electric motor is a drive motor of the electric bicycle.

* * * * *